Nov. 2, 1943.  G. H. HUFFERD  2,333,423
QUICK DISCONNECT COUPLING
Filed Sept. 29, 1941    3 Sheets-Sheet 2
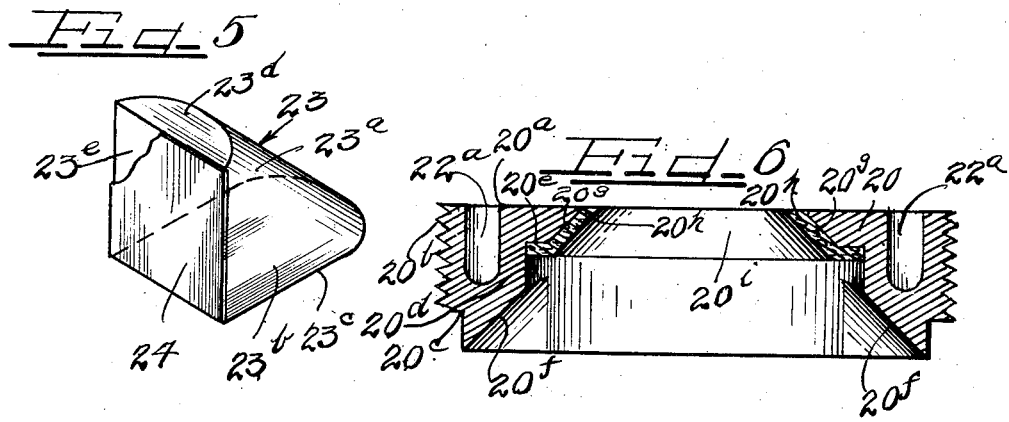
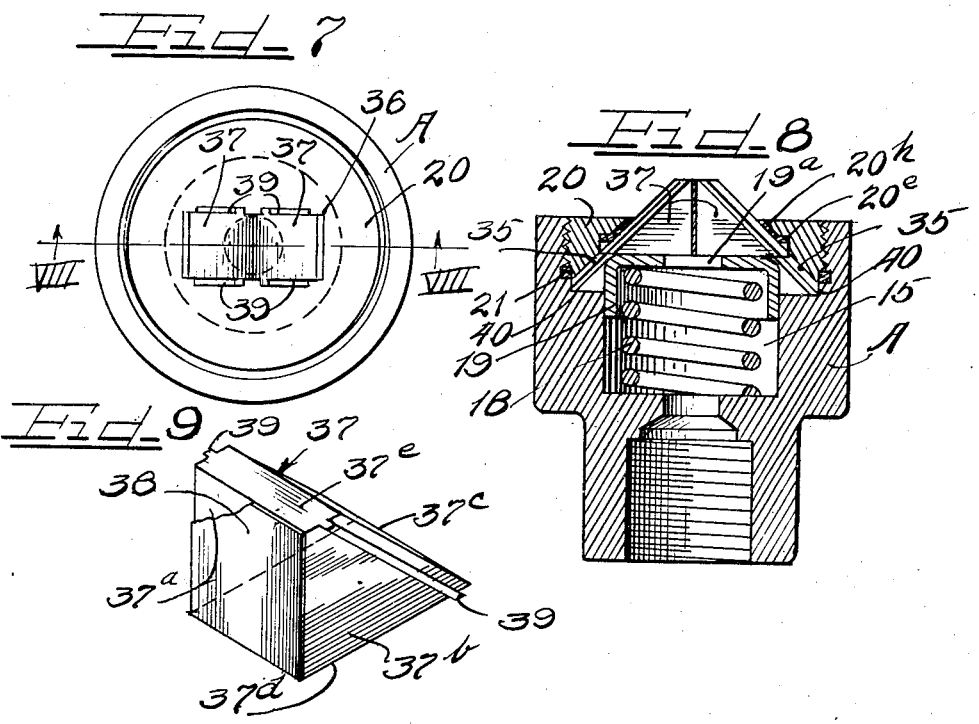
Inventor
George H. Hufferd
by Charles H. Hill Attys.

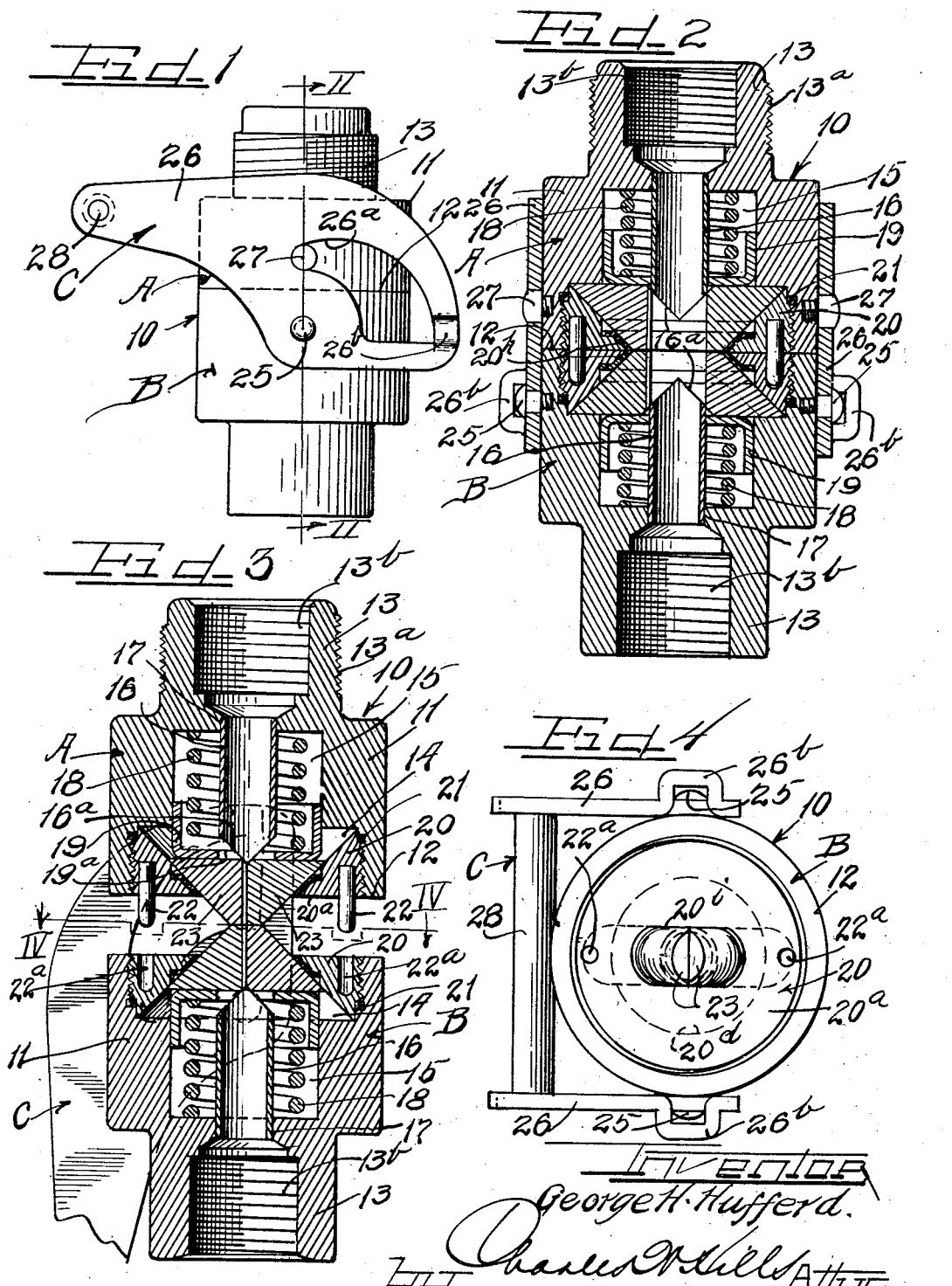

Nov. 2, 1943.  G. H. HUFFERD  2,333,423
QUICK DISCONNECT COUPLING
Filed Sept. 29, 1941  3 Sheets-Sheet 3
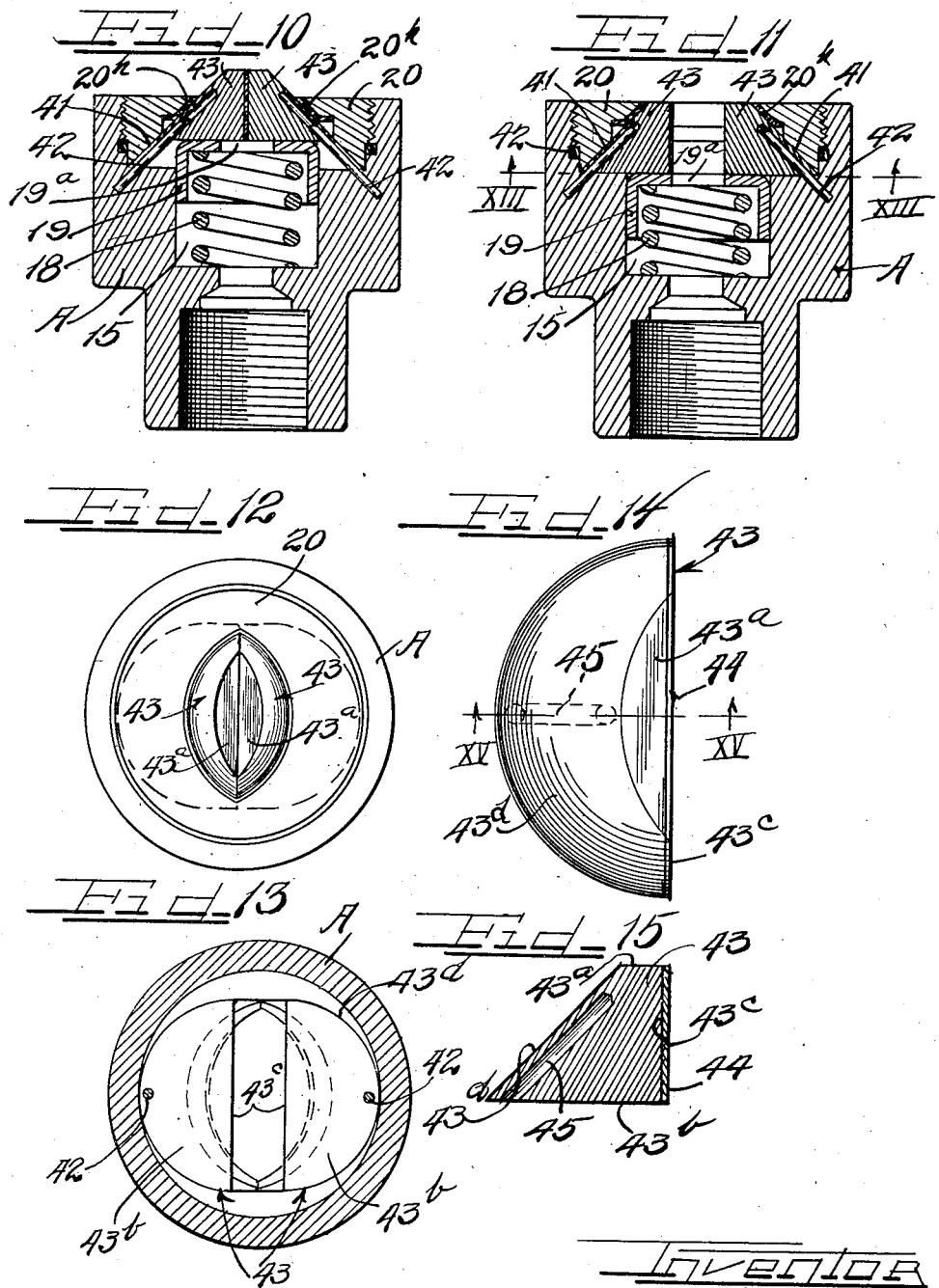

Patented Nov. 2, 1943

2,333,423

UNITED STATES PATENT OFFICE 2,333,423

QUICK DISCONNECT COUPLING

George H. Hufferd, Grosse Pointe, Mich., assignor to Thompson Products Incorporated, Cleveland, Ohio, a corporation of Ohio Application September 29, 1941, Serial No. 412,844

10 Claims. (Cl. 284—18)

This invention relates to coupling devices in which the coupling parts are arranged so as to open up when brought together and to close when separated.

More specifically the invention relates to self-sealing couplings which automatically close when disconnected and automatically open when connected.

It is highly desirable in many instances to provide a device for rapidly coupling and uncoupling together the ends of conduits such as hoses, tubes, and pipes. It is also highly desirable that the ends of these conduits be sealed when the same are uncoupled.

In accordance with the present invention couplings are now provided for joining conduit ends in fluid flow communication and for sealing such ends automatically upon disconnecting the same. The coupling devices of this invention are composed of two coupling boxes each having fluid flow passages therethrough closed by spring-urged chuck blocks. When the coupling boxes are brought together the chuck blocks are moved against spring pressure to open the passages in the coupling boxes. The mere act of bringing the coupling boxes together for the coupling operation is sufficient to automatically move the chuck blocks to their open position thereby placing any conduits to which the coupling boxes may be connected, in fluid flow communication. Upon disconnecting the coupling boxes the springs urge chuck blocks back to sealing position in each coupling box thereby sealing the conduit ends automatically each time the coupling is disconnected.

A feature of the invention includes a cam type operating lever to facilitate the coupling and uncoupling of the boxes without necessity for much manual effort to resist the spring pressures against the chuck blocks.

Another feature of the invention deals with the provision of conduit tubes in the coupling boxes for facilitating separation of the chuck blocks during the coupling operation and for defining a smooth flow path through the coupling boxes.

It is, then, an object of this invention to provide quick disconnect coupling devices which automatically close upon disconnecting of the coupling box and which automatically open upon coupling together of the parts.

A further object of the invention is to provide a self-sealing quick disconnect coupling composed of parts which, when brought together, automatically open up the sealing members and which, when separated, permit the automatic closing of the sealing members.

Another object of the invention is to provide an improved coupling having spring-urged sealing means which are readily opened during the coupling together of the coupling parts.

A further object of this invention is to provide a two-piece coupling with each piece having a spring-urged valve which is automatically opened when the pieces are brought together and which automatically closes when the pieces are separated.

A further object of the invention is to provide a coupling with parts having spring-urged chuck blocks acting as valves to provide a fluid flow passage through the parts when the same are connected and to provide seals for the parts when the same are disconnected.

Other and further objects of this invention will be apparent to those skilled in the art from the following detailed description of the annexed sheets of drawings which, by way of preferred examples, illustrate several embodiments of the invention.

On the drawings:

Figure 1 is a side elevational view of a coupling according to this invention.

Figure 2 is an enlarged vertical cross-sectional view taken along the line II—II of Figure 1.

Figure 3 is an enlarged vertical cross-sectional view similar to Figure 2 but illustrating the coupling parts in uncoupled or disconnected relation.

Figure 4 is a plan view of one of the coupling parts taken generally along the line IV—IV of Figure 3 and illustrating the coupling handle in full plan.

Figure 5 is an isometric view of one of the valve blocks of the coupling shown in Figures 1 to 4.

Figure 6 is an enlarged vertical cross-sectional view of a seat ring for the coupling of Figures 1 to 4.

Figure 7 is a plan view of a modified coupling part according to this invention.

Figure 8 is a vertical cross-sectional view taken along the line VIII—VIII of Figure 7.

Figure 9 is an isometric view of one of the valve blocks of the coupling parts shown in Figures 7 and 8.

Figure 10 is a vertical cross-sectional view of another embodiment of a coupling part according to this invention illustrating the same in closed position.

Figure 11 is a vertical cross-sectional view similar to Figure 10 but illustrating the coupling part in opened position.

Figure 12 is a top plan view of the coupling part shown in Figure 10.

Figure 13 is a cross-sectional view taken along the line XIII—XIII of Figure 11.

Figure 14 is an enlarged top plan view of one of the valve blocks used in the coupling part shown in Figures 10 to 13.

Figure 15 is a vertical cross-sectional view taken along the line XV—XV of Figure 14.

As shown on the drawings:

In Figures 1 to 4 inclusive the reference numeral 10 designates generally a coupling according to this invention composed of coupling parts A and B and a handle type coupling part connecting device C.

The coupling part A is composed of a cylindrical metal block 11 having a flat end face 12 at one end thereof and a hollow shank portion 13 extending from the other end thereof provided with external threads 13a and internal threads 13b.

The block 11 has an internally threaded recess 14 extending upwardly from the flat face 12 and a well portion 15 of smaller diameter than the recess 14 extending from the recess 14 toward the upper end of the block. A tube 16 is disposed in the well 15 and is firmly anchored at its upper end in a connecting passage 17 between the interior of the shank 13 and the well 15. The tube 16 has a pointed free end 16a extending into the recess 14.

A coil spring 18 is disposed in the recess 15 around the tube 16 and acts against a cap 19 which is slidably mounted in the well 15. The cap 19 has an aperture 19a in the head thereof adapted to receive the tube 16.

A valve seat ring 20 is threaded into the recess 14 of the block 11 into snug engagement with a packing ring or seal 21 disposed around the upper end of the recess 14.

The seat ring 20, as best shown in Figure 6, has a flat outer face 20a adapted to fit flush with the end face 12 of the block 11. The ring has an exterior thread 20b for threading into the recess 14 of the block 11. This thread 20b terminates at a shoulder 20c adapted to receive the packing ring 21 thereagainst. The ring 20 has a cylindrical bore 20d therein terminating in a shoulder 20e spaced from the flat face 20a. An initially rectangular opening 20i then extends from the shoulder through the face 20a of the ring. The bore 20d is angularly milled at diametrically opposite localized portions thereof to provide valve seats 20f. The opening 20i is also angularly milled from the shoulder 20e to the face 20a thereof to provide converging seats 20g which receive packing liners 20h. The liners extend over the shoulder 20e and define, with their inner faces, surfaces forming continuations of the surfaces provided by the seats 20f.

As a result, as shown in Figure 4, the face 20a of the ring 20 has an elongated slot opening 20i therethrough with rounded ends. This slot opening then extends into the ring 20 along the diverging paths provided by the seals 20h and the surfaces 20f.

Pins 22 are seated in the ring 20 of one coupling part and project from the flat face 20a thereof as shown in Figure 4 for seating in wells 22a of the ring in the other coupling part.

A pair of chuck-like blocks 23 are slidably mounted in the ring 20 on the surfaces 20f and 20h. The cap 19 is urged by the spring 18 against the bases of these blocks to slide the same into abutting face engagement for closing the passageway through the coupling member.

As best shown in Figure 5 each block 23 has a semi-cylindrical rounded back 23a, flat sides 23b, a flat base 23c, a flat top 23d, and a flat front face 23e. The flat front face 23e of one or both blocks can have a facing cover 24 of resilient sealing material such as rubber, fabric or the like affixed thereon so as to effect better sealing contact between the blocks.

The coupling part B is a substantial duplication of the coupling part A and contains similar springs 18, cap 19, chuck-like blocks 23, and block seating rings 20. The block seating ring 20 in the part B, however, has recesses 22a therein adapted to receive the pins 22. The shank portion 13 of the part B as shown is only internally threaded as at 13b but can of course be also externally threaded as on the part A if desired.

The coupling part B, as shown in Figures 1 and 2, has studs 25 thereon pivotally carrying levers 26 of the handle C. Each lever 26 has a cam opening 26a therein for receiving a pin 27 on the coupling part A. Each lever 26 also has an outwardly bent portion 26b through which the pin 27 can pass to permit removal of the same from the opening 26a when the lever handle C is tilted for uncoupling the parts A and B. As shown in Figure 4, when the handle 28 connecting the levers 26 is moved against the coupling part B the outwardly bowed portions 26b of the levers 26 are disposed over the pins 27 so that the coupling part A can be lifted away from the coupling part B.

When joining the coupling parts A and B together the pins 27 of the coupling part A are slid through the recessed portions 26b of the lever 26 and the operating handle 28 for the levers is then moved away from the coupling part B so as to draw down the pins 27 and coupling part A toward the coupling part B as the cam surfaces 26a ride over the pins. During the drawing together of the coupling parts A and B, however, the projecting chuck blocks or valve blocks 23 are pushed against each other and forced against the spring pressures into their respective seats. However, the pointed ends 16a of the tubes 16 in the respective coupling parts A and B force the blocks of each pair apart to cause the same to follow the diverging paths provided in the seating rings. As a result of this forcing of the blocks apart, as shown in Figure 2, the tubes 16 are placed in fluid flow communication and fluid from hoses, conduits or pipes which are connected in the shanks of the coupling parts are placed in fluid flow communication. The seals 20h of each coupling part are also placed in abutting relation as shown in Figure 2 so that leakage will not occur between the pairs of blocks.

To uncouple the parts A and B it is merely necessary to draw the operating handle 28 against the part B so as to release the pins 27 from engagement against the cam surfaces of the levers. The spring pressures acting on the blocks 23 in each coupling part will then immediately force the same outwardly to the positions shown in Figure 3. During this outward movement the blocks are forced together by the converging seats in the rings 20 and when the parts are completely uncoupled the sealing material 24 between the blocks seals the passage in each coupling part so that the now disconnected ends of the conduits, hoses, or tubes connected to the coupling parts are sealed against leakage.

In the embodiment shown in Figures 7 to 9 the pointed tubes 16 can be dispensed with and chuck blocks having flat walls can be used. In Figures 7 and 8 only one coupling part is shown but it will be understood that the complete coupling device includes a pair of these devices. As shown in Figures 7 and 8 the coupling part A has a seat 20 threaded therein, a packing ring 21 acting against the seat to prevent leakage and a well portion 15 receiving a coil spring 18 in the same manner as described in connection with the embodiment shown in Figures 1 to 4. The seat ring 20 in this embodiment, however, has diverging passages 35 therethrough defining a rectangular opening 36 at the top of the ring diverging inwardly to the shoulder 20a of the ring and receiving the sealing material 20h thereon. These same passages continue through the bottom of the ring 20.

As shown in Figures 7 and 8 a pair of wedge blocks 37 are mounted in the ring 20 to slide in the passages 35 and along the surfaces of the seals 20h. As shown in Figure 9 each wedge block 37 has a front flat face 37a, flat side walls 37b, an inclined wall 37c, a flat bottom 37d and a flat top 37e. The face 37a of one or both blocks can have a covering 38 of sealing material such as rubber, cork, fabric or the like secured thereon. Each side wall 37b has a projecting rib 39 thereon sloping parallel with the back wall 37c. These ribs 39 are slidably mounted in ways or grooves 40 formed in the side walls of the passages 35 of the ring 20.

When the coupling parts are disconnected the blocks 37 have the faces 37a or the seals on the faces in abutting engagement as shown in Figure 8 and the blocks are urged to this position by the springs such as 18. As shown in Figure 8 the blocks partially project from the seating ring 20. When opposed pairs of blocks have the top faces 37e thereof brought together as in coupling the parts together and when pressure is exerted thereon against the spring pressure 18 the blocks will be forced into the seating ring 20 and will separate because of the rib and groove construction which extends along divergent paths for each block. A passage will therefore be opened up between the blocks communicating with the aperture 19a in the slidable cap 19. In this modification, therefore, the ribs and grooves replace the tubes in the modification described in Figures 1 to 4 but the coupling operates on the same principle as described in Figures 1 to 4.

In the modification shown in Figures 10 to 15 the chuck blocks or valve blocks of the coupling parts are directed apart when pressure is exerted against the spring pressure urging the same together by means of pins carried by the coupling parts and entering diverging holes in the blocks. The blocks themselves are segments of a cylindrical rod having an inclined semi-cylindrical rear wall, a flat top, a flat bottom, and a flat inner face. The seating rings have the recesses therein shaped to accommodate the inclined semi-cylindrical surfaces of the blocks. These rings can be readily made by boring out semi-cylindrical connected passages through the rings.

While only one coupling part is shown in Figures 10 to 13 it will be understood that the other part of the coupling is substantially identical with the illustrated part.

In Figures 10 to 13 the coupling part A is formed substantially identically with the parts described in Figures 7 and 8, and receives the spring 18, cap 19 and a modified seating ring 20. This seating ring 20 has inclined semi-cylindrical seats 41 therein on diametrically opposed sides thereof part of which receive the seals 20h as in the above described modification. The coupling boxes also have pins 42 anchored therein and extending in front of the inclined seats 41 in spaced parallel relation therefrom. These pins terminate within the seating ring.

The valve blocks 43, as best shown in Figures 14 and 15, each have a flat top 43a, a flat bottom 43b, a flat front face 43c which may be covered with a sheet 44 of sealing material, and an inclined cylindrical wall 43d for seating on the seat 41 of the ring 20. The valve blocks may be considered as segments cut from a cylindrical rod by a plane extending inwardly to the axis of the rod and by a second plane extending outwardly from the rod axis normal to the first plane. The tops of the resulting segments are then cut flat to be parallel with the bottom wall cut by the first mentioned plane. The blocks may also be viewed as an inclined cylindrical segment with a flat innerface and flat top and bottom walls.

Each block has a well 45 extending from the bottom thereof into spaced relation from the top thereof and inclined in a direction parallel with the base 43b thereof to receive a pin 42.

When the coupling parts are disconnected, as shown in Figure 10, the spring 18 will urge the blocks outwardly while the pins 42 will guide the same into sealing engagement. When the spring pressure is resisted to collapse the spring the blocks will enter the seating ring 20 and will be directed apart by the pins 42.

From the above descriptions of the various embodiments of the invention it will be understood that various types of valve forming blocks may be used, and that various forms of valve block directing means can be used.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A coupling device comprising a pair of coupling parts, a plurality of valve blocks in each coupling part, means guiding said blocks along diverging paths in each part, spring means in each valve part urging said blocks into closed position and a locking device for holding said coupling parts together while acting on the blocks to move the same relative to the parts whereby said valve blocks in each coupling part will seal each part when the same are disconnected and will join the parts in fluid flow communication when the same are connected.

2. A coupling comprising a pair of parts, a device for locking said parts together, each of said parts having passages therethrough, spring urged valve parts in each of said parts for sealing said passages, and means for separating said valve parts in each part to open said passages upon joining of the coupling parts to connect the coupling parts in fluid flow communication.

3. A coupling unit comprising a pair of complementary coupling parts, valve blocks slidably mounted in each of said parts and adapted to project therefrom into closed position for sealing each of said parts, means for drawing the coupling parts together to retract the valve blocks in their respective parts, and means in each of said coupling parts to separate the valve blocks of each pair as the same are retracted.

4. A quick, disconnect self-sealing coupling comprising a pair of complementary coupling members each having a passageway therethrough, wedge blocks slidably mounted in each of said coupling parts to seal said passages when the coupling parts are disconnected, and means automatically separating the wedge blocks of each coupling part when the coupling parts are connected for joining the passages in the parts.

5. A quick disconnect coupling comprising a pair of complementary coupling parts, a pair of levers pivotally connected to one of said parts and each having a cam recess therein, pins carried by the other of said coupling parts adapted to be seated in said recess for drawing the coupling parts together, and spring urged valves in each of said coupling parts arranged to open as the coupling parts are drawn together.

6. A coupling device comprising a pair of coupling members, a lever pivotally mounted on one of said members and having a cam surface, a pin mounted on the other of said members adapted to be acted on by said cam surface for drawing the coupling parts together as the lever is tilted, spring urged valve members projecting from each of said coupling parts when the same are disconnected to seal the parts, and means in each of said coupling parts opening said valves as the coupling parts are drawn together.

7. In a coupling including complementary coupling parts the improvement which comprises a plurality of valve blocks slidably mounted in each complementary coupling part for sealing the parts when the same are disconnected, and means in each coupling part for automatically separating the valve blocks in each part as the coupling parts are drawn together during a coupling operation to open up a connecting passage between the parts.

8. In a coupling device, a coupling box having a well and a conduit passage therein, a hollow tube secured in said box joining the well and conduit passage, said tube having a pointed free end projecting into the well, a plurality of valve blocks slidably mounted in said box for sealing the mouth of the well, means for urging the blocks into sealing position, and said valve blocks adapted to be depressed against the force of the urging means by drawing a complementary coupling part toward the box whereby the pointed end of the tube will spread the blocks apart to effect separation of the blocks for joining the conduit passage with the space between the blocks.

9. In a coupling device, a coupling box having a well and a conduit passage therein, said well having an enlarged countersunk end portion, a seat ring mounted in said enlarged countersunk end portion of the well, said seat ring having a bore therethrough defining diverging valve seats, valve blocks slidably mounted on said diverging valve seats, spring means urging said valve blocks toward the converging ends of the seats to move the blocks together for sealing the well, and means carried by said box for spreading the valve blocks apart as they are depressed toward the diverging ends of the valve seats to open up a passageway between the blocks and thereby unseal the well.

10. A coupling comprising a pair of coupling boxes each having recessed mating end faces, and conduit passages, a tube joining the conduit passage of each box with the recessed portion of the box, each tube having a pointed end disposed in said recessed portion of the box, a plurality of valve blocks slidably mounted in the recessed portion of each box, sealing material between the valve blocks and coupling boxes, spring means urging the valve blocks beyond the mating end faces of the coupling boxes, guide means for directing the valve blocks along converging paths into sealing engagement for closing the recesses of the coupling boxes, and means for drawing the coupling boxes together with the projecting ends of the valve blocks in abutment whereby the pointed ends of said tubes will separate the blocks to open up therebetween a passageway joining the tubes and thereby connecting the conduit passages in fluid flow communication.

GEORGE H. HUFFERD.